US010817777B2

(12) United States Patent
Kim et al.

(10) Patent No.: US 10,817,777 B2
(45) Date of Patent: Oct. 27, 2020

(54) LEARNING METHOD AND LEARNING DEVICE FOR INTEGRATING OBJECT DETECTION INFORMATION ACQUIRED THROUGH V2V COMMUNICATION FROM OTHER AUTONOMOUS VEHICLE WITH OBJECT DETECTION INFORMATION GENERATED BY PRESENT AUTONOMOUS VEHICLE, AND TESTING METHOD AND TESTING DEVICE USING THE SAME

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/724,302

(22) Filed: Dec. 22, 2019

(65) Prior Publication Data
US 2020/0250514 A1     Aug. 6, 2020

Related U.S. Application Data

(60) Provisional application No. 62/799,124, filed on Jan. 31, 2019.

(51) Int. Cl.
*G06N 3/04* (2006.01)
*G06K 9/00* (2006.01)
(Continued)

(52) U.S. Cl.
CPC ....... *G06N 3/0454* (2013.01); *G06K 9/00805* (2013.01); *G06K 9/6256* (2013.01); *G06K 9/6267* (2013.01); *G06N 3/08* (2013.01)

(58) Field of Classification Search
CPC ........ G06N 3/0454; G06N 3/08; G06N 20/00; G06K 9/00805; G06K 9/6256;
(Continued)

(56) References Cited

U.S. PATENT DOCUMENTS 8,977,006 B2 * 3/2015 Guan ................. G06K 9/00805
382/103
10,060,751 B1 * 8/2018 Chen ..................... G01C 21/32
(Continued)

FOREIGN PATENT DOCUMENTS

CN       108875819 A   * 11/2018

OTHER PUBLICATIONS

Liu et al., "Occluded Street Objects Perception Algorithm of Intelligent Vehicles Based on 3D Projection Model" Jun. 14, 2018, Journal of Advanced Transportation, pp. 1-11. (Year: 2018).*
(Continued)

*Primary Examiner* — Miranda M Huang
*Assistant Examiner* — Chase P. Hinckley
(74) *Attorney, Agent, or Firm* — Xsensus LLP (57) ABSTRACT

A learning method for generating integrated object detection information by integrating first object detection information and second object detection information is provided. And the method includes steps of: (a) a learning device instructing a concatenating network to generate one or more pair feature vectors; (b) the learning device instructing a deter-
(Continued)

mining network to apply FC operations to the pair feature vectors, to thereby generate (i) determination vectors and (ii) box regression vectors; (c) the learning device instructing a loss unit to generate an integrated loss by referring to the determination vectors, the box regression vectors and their corresponding GTs, and performing backpropagation processes by using the integrated loss, to thereby learn at least part of parameters included in the DNN.

18 Claims, 4 Drawing Sheets

(51) Int. Cl.
*G06K 9/62* (2006.01)
*G06N 3/08* (2006.01)
(58) Field of Classification Search
CPC . G06K 9/6267; H04W 4/46; B60K 2370/175; B64G 2001/247
USPC .......................................................... 706/20
See application file for complete search history.

(56) References Cited

U.S. PATENT DOCUMENTS

| | | | | |
|---|---|---|---|---|
| 10,099,614 | B2* | 10/2018 | Diessner | G06K 9/00805 |
| 10,157,331 | B1 | 12/2018 | Tang et al. | |
| 10,169,679 | B1 | 1/2019 | Kim et al. | |
| 10,380,434 | B2* | 8/2019 | Gor | G06K 9/00805 |
| 10,380,753 | B1* | 8/2019 | Csordas | G06T 7/33 |
| 10,473,793 | B2* | 11/2019 | Neubecker | G01S 19/31 |
| 10,474,930 | B1* | 11/2019 | Kim | G06N 3/0454 |
| 10,496,891 | B2* | 12/2019 | Sai, Sr. | B60R 1/00 |
| 10,567,934 | B1* | 2/2020 | Stahlin | H04W 4/40 |
| 10,599,931 | B2* | 3/2020 | Miville | G06K 9/00805 |
| 10,621,495 | B1* | 4/2020 | Huval | G06K 9/00791 |
| 10,671,068 | B1* | 6/2020 | Xu | G05D 1/0212 |
| 10,678,240 | B2* | 6/2020 | Pollach | G06N 7/005 |
| 2010/0198513 | A1* | 8/2010 | Zeng | G01S 5/0072 |
| | | | | 701/300 |
| 2011/0251768 | A1* | 10/2011 | Luo | B60W 30/12 |
| | | | | 701/70 |
| 2013/0222127 | A1* | 8/2013 | Ray Avalani | G08G 1/167 |
| | | | | 340/436 |
| 2014/0313339 | A1* | 10/2014 | Diessner | G06K 9/00805 |
| | | | | 348/148 |
| 2015/0336547 | A1* | 11/2015 | Dagan | B60T 7/22 |
| | | | | 701/70 |
| 2016/0096270 | A1* | 4/2016 | Ibarz Gabardos | B25J 9/161 |
| | | | | 700/253 |
| 2016/0221575 | A1* | 8/2016 | Posch | B60W 50/0098 |
| 2017/0358102 | A1 | 12/2017 | Akiyama | |
| 2018/0024562 | A1* | 1/2018 | Bellaiche | G01S 19/48 |
| | | | | 701/26 |
| 2018/0114441 | A1* | 4/2018 | Marmet | H04W 4/44 |
| 2018/0188026 | A1* | 7/2018 | Zhang | G06T 17/05 |
| 2018/0276912 | A1* | 9/2018 | Zhou | G07C 5/0808 |
| 2018/0286199 | A1 | 10/2018 | Chen et al. | |
| 2018/0357537 | A1* | 12/2018 | Munkberg | G06N 3/084 |
| 2018/0364366 | A1* | 12/2018 | Cvijetic | G01S 19/07 |
| 2018/0365913 | A1* | 12/2018 | Nix | G07C 5/0841 |
| 2019/0026597 | A1* | 1/2019 | Zeng | H04L 67/12 |
| 2019/0039612 | A1* | 2/2019 | Yang | G01S 5/0072 |
| 2019/0057263 | A1* | 2/2019 | Miville | G01S 13/867 |
| 2019/0057507 | A1* | 2/2019 | El-Khamy | G06K 9/66 |
| 2019/0063932 | A1* | 2/2019 | Tran | G06T 7/0002 |
| 2019/0066326 | A1* | 2/2019 | Tran | G06N 3/08 |
| 2019/0073553 | A1* | 3/2019 | Yao | G06K 9/46 |
| 2019/0101985 | A1* | 4/2019 | Sajda | G06F 3/013 |
| 2019/0102908 | A1* | 4/2019 | Yang | G06K 9/00335 |
| 2019/0103026 | A1* | 4/2019 | Liu | G06K 9/00805 |
| 2019/0122378 | A1* | 4/2019 | Aswin | G06N 3/08 |
| 2019/0147245 | A1* | 5/2019 | Qi | G06K 9/00664 |
| | | | | 382/103 |
| 2019/0188541 | A1* | 6/2019 | Wang | G06K 9/6221 |
| 2019/0220744 | A1* | 7/2019 | Yao | G05D 1/0088 |
| 2019/0228266 | A1* | 7/2019 | Habibian | G06K 9/6262 |
| 2019/0244329 | A1* | 8/2019 | Li | G06T 5/002 |
| 2019/0250626 | A1* | 8/2019 | Ghafarianzadeh | |
| | | | | B60K 31/0008 |
| 2019/0258251 | A1* | 8/2019 | Ditty | G05D 1/0088 |
| 2019/0258878 | A1* | 8/2019 | Koivisto | G05D 1/0246 |
| 2019/0333232 | A1* | 10/2019 | Vallespi-Gonzalez | |
| | | | | G06N 5/003 |
| 2019/0371179 | A1* | 12/2019 | Christen | G08G 1/04 |
| 2019/0391578 | A1* | 12/2019 | Tariq | G06N 7/005 |
| 2019/0392268 | A1* | 12/2019 | Tariq | G06K 9/627 |
| 2020/0005489 | A1* | 1/2020 | Kroeger | G06T 7/80 |
| 2020/0025935 | A1* | 1/2020 | Liang | G01S 7/4817 |
| 2020/0026282 | A1* | 1/2020 | Choe | G05D 1/0257 |
| 2020/0090322 | A1* | 3/2020 | Seo | G06N 3/04 |
| 2020/0160559 | A1* | 5/2020 | Urtasun | G06N 20/00 |
| 2020/0193181 | A9* | 6/2020 | Steinberg | G01S 17/04 |

OTHER PUBLICATIONS

Vu, Tuan-Hung, "Learning visual models for person detection and action prediction" Aug. 24, 2018, Doctoral Dissertation, Ecole Normale Superieure de Paris, pp. i-156. (Year: 2018).*

Li et al., "Towards End-to-End Car License Plates Detection and Recognition with Deep Neural Networks" Sep. 26, 2017, IEEE Transactions on Intelligent Transportation Systems, pp. 1-9. (Year: 2017).*

Jha, Pratyakasha "A Brief Overview of Loss Functions in Pytorch" Jan. 6, 2019 pp. 1-9. (Year: 2019).*

Zhao et al., "Object Detection with Deep Learning: A Review" Jul. 15, 2018, Journal of Latex Class Files, vol. 14, No. 8, pp. 1-21. (Year: 2018).*

Vasic, Milos "Cooperative Perception Algorithms for Networked Intelligent Vehicles" Aug. 18, 2017, Doctoral Dissertation, Ecole Polytechnique Federale de Lausanne, pp. i-183. (Year: 2017).*

Yee et al., "Collaborative Perception for Automated Vehicles Leveraging Vehicle-to-Vehicle Communications" Jun. 26-30, 2018, IEEE Intelligent Vehicle Symposium, pp. 1099-1106. (Year: 2018).*

Bell et al., "Inside-Outside Net: Detecting Objects in Context with Skip Pooling and Recurrent Neural Networks" Dec. 14, 2015, pp. 1-11. (Year: 2015).*

Maleej et al., "Vanets Meet Autonomous Vehicles: Multimodal Surrounding Recognition Using Manifold Alignment" Jun. 20, 2018. (Year: 2018).*

Maleej, Yassine "Vehicular Clouds and Networking for Semi-Supervised Alignment of Manifolds of Stereo and LIDAR for Autonomous Vehicles" Aug. 2018, Doctoral Dissertation, University of Idaho, pp. i-149. (Year: 2018).*

Price, Stanton Robert "Fusion of evolution constructed features for computer vision" May 2018, Doctoral Dissertation, Mississippi State University, pp. i-142. (Year: 2018).*

Aeberhard, Michael "Object-Level Fusion for Surround Environment Perception in Automated Driving Applications" 2017, Doctoral Dissertation, Technische Universitat Dortmund, pp. i-201. (Year: 2017).*

Benli et al., "Dynamic 3-D Reconstruction of Human Targets via an Omni-Directional Thermal Sensor" Sep. 1, 2018, IEEE Sensors Journal, vol. 18, No. 17, pp. 7209-7221. (Year: 2018).*

Vega et al., "Towards 'Smarter' Vehicles through Cloud-Backed Swarm Cognition" Jun. 26-30, 2018, IEEE Intelligent Vehicles Symposium, pp. 1079-1086. (Year: 2018).*

Xiao et al., "Multimedia Fusion at Semantic Level in Vehicle [sic] Cooperative Perception" 2018 IEEE. (Year: 2018).*

Dubbed et al., "Advanced Microsystems for Automotive Applications 2018" 2018, pp. i-196 (Year: 2018).*

Kim et al., "Multivehicle Cooperative Driving Using Cooperative Perception: Design and Experimental Validation" Apr. 2015, IEEE Transactions on Intelligent Transportation Systems, vol. 16, No. 2, pp. 663-680. (Year: 2015).*

(56) References Cited

OTHER PUBLICATIONS

Wang et al., "DeLS-3D: Deep Localization and Segmentation with a 3D Semantic Map" 2018, pp. 5860-5869. (Year: 2018).*
Rauch et al., "Inter-Vehicle Object Association for Cooperative Perception Systems" Oct. 6-9, 2013, Proceedings of the 16th International IEEE Annual Conference on Intelligent Transportation Systems, pp. 893-898. (Year: 2013).*
Rosenstatter et al., "Modelling the Level of Trust in a Cooperative Automated Vehicle Control System" Apr. 2018, IEEE Transactions on Intelligent Transportation Systems, vol. 19, No. 4, pp. 1237-1247. (Year: 2018).*
Lee et al., "Multi-Target Track-to-Track Fusion Based on Permutation Matrix Track Association" Jun. 26-30, 2018, IEEE Intelligent Vehicles Symposium, pp. 465-470. (Year: 2018).*
Peng et al., "Intelligent Method for Identifying Driving Risk Based on V2V Multisource Big Data" 2018, pp. 1-9. (Year: 2018).*
Gunther et al., "Realizing Collective Perception in a Vehicle" 2016, IEEE Vehicular Networking Conference. (Year: 2016).*
Al-refai et al., "A Framework for Background Modeling Using Vehicle-to-Infrastructure Communication for Improved Candidate Generation in Pedestrian Detection" 2018, IEEE, pp. 0729-0735. (Year: 2018).*
Xu et al., "PointFusion: Deep Sensor Fusion for 3D Bounding Box Estimation" Aug. 25, 2018. (Year: 2018).*
Yan et al., "A New Two-Stage Object Detection Network without RoI Pooling" 2018, IEEE, pp. 1680-1685. (Year: 2018).*
Rezaei et al., "Computer Vision for Driver Assistance" 2017, Computational Imaging and Vision, No. 45, pp. i-224. (Year: 2017).*
Armingol et al., "Environmental Perception for Intelligent Vehicles" 2018, Intelligent Vehicles, pp. 23-101. (Year: 2018).*

\* cited by examiner

LEARNING METHOD AND LEARNING DEVICE FOR INTEGRATING OBJECT DETECTION INFORMATION ACQUIRED THROUGH V2V COMMUNICATION FROM OTHER AUTONOMOUS VEHICLE WITH OBJECT DETECTION INFORMATION GENERATED BY PRESENT AUTONOMOUS VEHICLE, AND TESTING METHOD AND TESTING DEVICE USING THE SAME

CROSS REFERENCE OF RELATED APPLICATION

This present application claims the benefit of the earlier filing date of provisional patent application No. 62/799,124, filed Jan. 31, 2019, the entire contents of which being incorporated herein by reference.

FIELD OF THE DISCLOSURE

The present disclosure relates to a learning method and a learning device for use with an autonomous vehicle; and more particularly, to the method and the device for a heterogeneous sensor fusion by using a merging network, and a testing method and a testing device using the same.

BACKGROUND OF THE DISCLOSURE

Deep Convolutional Neural Networks (Deep CNNs) are at the heart of the remarkable development in deep learning. CNNs have already been used in the 90's to solve problems of character recognition, but their use has become as widespread as it is now thanks to recent researches. These CNNs have won the 2012 ImageNet image classification tournament, crushing other competitors. Then, the convolutional neural network became a very useful tool in the field of the machine learning.

Such CNNs are also used in a field of autonomous driving. The CNNs are responsible for image processing such as semantic segmentation, object detection, and free space detection in autonomous vehicles. As a result, a vehicle equipped with the CNNs can generate a space detection result by determining which object is located in a space around itself.

On the other hand, V2X technology is getting popular recently. V2X is an abbreviation of vehicle-to-everything, which refers to a communication technology that connects vehicles to other objects online. V2V technology, a kind of V2X technology, is an abbreviation of vehicle-to-vehicle, which refers to a communication technology between a vehicle and a vehicle. There are many things that can be done with the V2V technology, and if it is applied to autonomous vehicles, there will be a big improvement. Especially, if results of the space detection using the CNNs described above are shared using the V2V technology, the probability of accidents can be greatly reduced.

However, it is relatively difficult to share the space detection result with one another because each of vehicles performs its own spatial detection based on itself.

SUMMARY OF THE DISCLOSURE

It is an object of the present disclosure to solve all the aforementioned problems.

It is another object of the present disclosure to provide a learning method for integrating object detection information acquired through V2V communication from other autonomous vehicle with object detection information generated by a present autonomous vehicle, to thereby improve a safety of autonomous vehicles using an integrated space detection result.

In accordance with one aspect of the present disclosure, there is provided a learning method for generating integrated object detection information on an integrated target space including a first target space and a second target space, by integrating first object detection information on the first target space generated by a first vehicle and second object detection information on the second target space generated by a second vehicle, including steps of: (a) a learning device, if the first object detection information on the first target space and the second object detection information on the second target space are acquired by processing a first original image on the first target space and a second original image on the second target space, instructing a concatenating network included in a DNN to generate one or more pair feature vectors including information on one or more pairs of first original ROIs included in the first target space and second original ROIs in the second target space; (b) the learning device instructing a determining network included in the DNN to apply one or more FC operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative 3-dimensional locations of integrated ROIs, corresponding to at least part of the pairs, comparing to each of original 3-dimensional locations of each component of said at least part of the pairs, on the integrated target space; (c) the learning device instructing a loss unit to generate an integrated loss by referring to the determination vectors, the box regression vectors and their corresponding GTs, and performing backpropagation processes by using the integrated loss, to thereby learn at least part of parameters included in the DNN.

As one example, at the step of (a), a specific pair feature vector, which is one of the pair feature vectors, includes (i) first class information of a first specific object included in the first target space, (ii) feature values of a first specific original ROI including the first specific object, (iii) 3-dimensional coordinate values of a first specific original bounding box corresponding to the first specific original ROI, (iv) 3-dimensional coordinate values of the first specific original ROI, (v) second class information of a second specific object included in the second target space, (vi) feature values of a second specific original ROI including the second specific object, and (vii) 3-dimensional coordinate values of a second specific original bounding box corresponding to the second specific original ROI, and (viii) 3-dimensional coordinate values of the second specific original ROI.

As one example, at the step of (b), a specific determination vector, which is one of the determination vectors and corresponds to the specific pair feature vector, includes information on a probability of the first specific original ROI and the second specific original ROI being integrated on the integrated target space, and a specific box regression vector, which is one of the box regression vectors and corresponds to the specific pair feature vector, includes information on 3-dimensional coordinates of a specific integrated bounding box generated by merging the first specific original ROI and the second specific original ROI on the integrated target space.

As one example, at the step of (c), the learning device instructs the loss unit (i) to generate a determination loss by using at least part of the determination vectors through a cross entropy method, (ii) to generate a box regression loss by using at least part of the box regression vectors through a smooth-L1 method, and (iii) to generate the integrated loss by referring to the determination loss and the box regression loss.

As one example, at the step of (c), the determination loss is generated by a formula below:

$$L_c = \frac{1}{n}\sum_{i=1}^{n} \langle v_c^i, \log(v_{C-GT}^i) \rangle$$

wherein n denotes the number of the determination vectors, $v_c^i$ denotes an i-th determination vector, $v_{C-GT}^i$ denotes an i-th determination GT vector on the i-th determination vector, and the box regression loss is generated by a formula below:

$$L_r = \frac{1}{n}\sum_{i=1}^{n} smooth_{L1}(v_r^i, v_{R-GT}^i)$$

$$\text{where } smooth_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_c^i$ denotes an i-th box regression vector, $v_{C-GT}^i$ denotes an i-th box regression GT vector on the i-th box regression vector.

As one example, the learning device instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

As one example, at the step of (b), the learning device instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other part of the FC operations to the specific pair feature vectors.

In accordance with another aspect of the disclosure, there is provided a testing method for generating integrated object detection information for testing on an integrated target space for testing including a first target space for testing and a second target space for testing, by integrating first object detection information for testing on the first target space for testing generated by a first vehicle for testing and second object detection information for testing on the second target space for testing generated by a second vehicle for testing, including steps of: (a) on condition that (1) a learning device, if first object detection information for training on a first target space for training and second object detection information for training on a second target space for training have been acquired by processing a first original image for training on the first target space for training and a second original image for training on the second target space for training, instructing a concatenating network included in a DNN to generate one or more pair feature vectors for training including information on one or more pairs for training of first original ROIs for training included in the first target space for training and second original ROIs for training in the second target space for training; (2) the learning device instructing a determining network included in the DNN to apply one or more FC operations to the pair feature vectors for training, to thereby generate (i) one or more determination vectors for training including information on probabilities for training of the first original ROIs for training and the second original ROIs for training included in each of the pairs for training being appropriate to be integrated and (ii) one or more box regression vectors for training including information on each of relative 3-Dimensional locations for training of integrated ROIs for training, corresponding to at least part of the pairs for training, comparing to each of original 3-Dimensional locations for training of each component of said at least part of the pairs for training, on an integrated target space for training; (3) the learning device instructing a loss unit to generate an integrated loss by referring to the determination vectors for training, the box regression vectors for training and their corresponding GTs, and performing backpropagation processes by using the integrated loss, to thereby learn at least part of parameters included in the DNN, a testing device installed on the first vehicle, if the first object detection information for testing on the first target space for testing and the second object detection information for testing on the second target space for testing are acquired by processing a first original image for testing on the first target space for testing and a second original image for testing on the second target space for testing, instructing the concatenating network included in the DNN to generate one or more pair feature vectors for testing including information on one or more pairs for testing of first original ROIs for testing included in the first target space for testing and second original ROIs for testing in the second target space for testing; (b) the testing device instructing the determining network included in the DNN to apply the FC operations to the pair feature vectors for testing, to thereby generate (i) one or more determination vectors for testing including information on probabilities for testing of the first original ROIs for testing and the second original ROIs for testing included in each of the pairs for testing being appropriate to be integrated and (ii) one or more box regression vectors for testing including information on each of relative 3-dimensional locations for testing of integrated ROIs for testing, corresponding to at least part of the pairs for testing, comparing to each of original 3-Dimensional locations for testing of each component of said at least part of the pairs for testing, on the integrated target space for testing; (c) the testing device instructing a merging unit to generate the integrated object detection information for testing by merging at least part of the pairs for testing of first original bounding boxes for testing and second original bounding boxes for testing by referring to the determination vectors for testing and the box regression vectors for testing.

As one example, the first original image for testing on the first target space for testing, acquired through at least part of one or more first cameras, one or more first lidars and one or more first radars installed on the first vehicle, is processed by a first neural network included in the first vehicle, to thereby generate the first object detection information for testing including (i) first class information for testing on objects for testing included in the first target space for testing, (ii) feature values for testing of the first original ROIs for testing, (iii) 3-dimensional coordinate values for testing of the first original bounding boxes for testing and (iv) 3-dimensional coordinate values for testing of the first original ROIs for testing, and the second original image for testing on the second target space for testing, acquired through at least part of one or more second cameras, one or more second lidars and one or more second radars installed on the second vehicle, is processed by a second neural network included in the second vehicle, to thereby generate the second object detection information including (i) second class information on objects for testing included in the second target space for testing, (ii) feature values for testing of the second original ROIs for testing, (iii) 3-dimensional coordinate values for testing of the second original bounding boxes for testing and (iv) 3-dimensional coordinate values for testing of the second original ROIs for testing, and the second object detection information is delivered to the first vehicle through a V2V communication.

As one example, at the step of (a), a specific pair feature vector for testing, which is one of the pair feature vectors for testing, includes (i) first class information for testing of a first specific object for testing included in the first target space for testing, (ii) feature values for testing of a first specific original ROI for testing including the first specific object for testing, (iii) 3-dimensional coordinate values of a first specific original bounding box for testing corresponding to the first specific original ROI for testing, (iv) 3-dimensional coordinate values of the first specific original ROI for testing, (v) second class information for testing of a second specific object for testing included in the second target space for testing, (vi) feature values for testing of a second specific original ROI for testing including the second specific object for testing, (vii) 3-dimensional coordinate values of a second specific original bounding box for testing corresponding to the second specific original ROI for testing, and (viii) 3-dimensional coordinate values of the second specific original ROI for testing.

As one example, at the step of (b), a specific determination vector for testing, which is one of the determination vectors for testing and corresponds to the specific pair feature vector for testing, includes information on a probability of the first specific original ROI for testing and the second specific original ROI for testing being integrated on the integrated target space for testing, and a specific box regression vector for testing, which is one of the box regression vectors for testing and corresponds to the specific pair feature vector for testing, includes information on 3-dimensional coordinates of a specific integrated bounding box for testing generated by merging the first specific original ROI for testing and the second specific original ROI for testing on the integrated target space for testing.

In accordance with still another aspect of the present disclosure, there is provided a learning device for generating integrated object detection information for testing on an integrated target space including a first target space and a second target space, by integrating first object detection information on the first target space generated by a first vehicle and second object detection information on the second target space generated by a second vehicle, including: at least one memory that stores instructions; and at least one processor configured to execute the instructions to perform processes of: (I) if the first object detection information on the first target space and the second object detection information on the second target space are acquired by processing a first original image on the first target space and a second original image on the second target space, instructing a concatenating network included in a DNN to generate one or more pair feature vectors including information on one or more pairs of first original ROIs included in the first target space and second original ROIs in the second target space; (II) instructing a determining network included in the DNN to apply one or more FC operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative 3-dimensional locations of integrated ROIs, corresponding to at least part of the pairs, comparing to each of original 3-dimensional locations of each component of said at least part of the pairs, on the integrated target space; (III) instructing a loss unit to generate an integrated loss by referring to the determination vectors, the box regression vectors and their corresponding GTs, and performing backpropagation processes by using the integrated loss, to thereby learn at least part of parameters included in the DNN.

As one example, at the process of (I), a specific pair feature vector, which is one of the pair feature vectors, includes (i) first class information of a first specific object included in the first target space, (ii) feature values of a first specific original ROI including the first specific object, (iii) 3-dimensional coordinate values of a first specific original bounding box corresponding to the first specific original ROI, (iv) 3-dimensional coordinate values of the first specific original ROI, (v) second class information of a second specific object included in the second target space, (vi) feature values of a second specific original ROI including the second specific object, and (vii) 3-dimensional coordinate values of a second specific original bounding box corresponding to the second specific original ROI, and (viii) 3-dimensional coordinate values of the second specific original ROI.

As one example, at the process of (II), a specific determination vector, which is one of the determination vectors and corresponds to the specific pair feature vector, includes information on a probability of the first specific original ROI and the second specific original ROI being integrated on the integrated target space, and a specific box regression vector, which is one of the box regression vectors and corresponds to the specific pair feature vector, includes information on 3-dimensional coordinates of a specific integrated bounding box generated by merging the first specific original ROI and the second specific original ROI on the integrated target space.

As one example, at the process of (III), the processor instructs the loss unit (i) to generate a determination loss by using at least part of the determination vectors through a cross entropy device, (ii) to generate a box regression loss by using at least part of the box regression vectors through a smooth-L1 device, and (iii) to generate the integrated loss by referring to the determination loss and the box regression loss.

As one example, at the process of (III), the determination loss is generated by a formula below:

$$L_c = \frac{1}{n}\sum_{i=1}^{n} \langle v_c^i, \log(v_{C\_GT}^i) \rangle$$

wherein n denotes the number of the determination vectors, $v_c^i$ denotes an i-th determination vector, $v_{C\text{-}GT}^i$ denotes an i-th determination GT vector on the i-th determination vector, and the box regression loss is generated by a formula below:

$$L_r = \frac{1}{n}\sum_{i=1}^{n} smooth_{L1}(v_r^i, v_{R\text{-}GT}^i)$$

$$\text{where } smooth_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_c^i$ denotes an i-th box regression vector, $v_{C\text{-}GT}^i$ denotes an i-th box regression GT vector on the i-th box regression vector.

As one example, the processor instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

As one example, at the process of (II), the processor instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other part of the FC operations to the specific pair feature vectors.

In accordance with still yet another aspect of the present disclosure, there is provided a testing device for generating integrated object detection information on an integrated target space for testing including a first target space for testing and a second target space for testing, by integrating first object detection information for testing on the first target space for testing generated by a first vehicle for testing and second object detection information for testing on the second target space for testing generated by a second vehicle for testing, including: at least one memory that stores instructions; and at least one processor configured to execute the instructions to perform processes of: (I) on condition that (1) a learning device, if first object detection information for training on a first target space for training and second object detection information for training on a second target space for training have been acquired by processing a first original image for training on the first target space for training and a second original image for training on the second target space for training, instructing a concatenating network included in a DNN to generate one or more pair feature vectors for training including information on one or more pairs for training of first original ROIs for training included in the first target space for training and second original ROIs for training in the second target space for training; (2) the learning device instructing a determining network included in the DNN to apply one or more FC operations to the pair feature vectors for training, to thereby generate (i) one or more determination vectors for training including information on probabilities for training of the first original ROIs for training and the second original ROIs for training included in each of the pairs for training being appropriate to be integrated and (ii) one or more box regression vectors for training including information on each of relative 3-Dimensional locations for training of integrated ROIs for training, corresponding to at least part of the pairs for training, comparing to each of original 3-Dimensional locations for training of each component of said at least part of the pairs for training, on an integrated target space for training; (3) the learning device instructing a loss unit to generate an integrated loss by referring to the determination vectors for training, the box regression vectors for training and their corresponding GTs, and performing backpropagation processes by using the integrated loss, to thereby learn at least part of parameters included in the DNN, if the first object detection information for testing on the first target space for testing and the second object detection information for testing on the second target space for testing are acquired by processing a first original image for testing on the first target space for testing and a second original image for testing on the second target space for testing, instructing the concatenating network included in the DNN to generate one or more pair feature vectors for testing including information on one or more pairs for testing of first original ROIs for testing included in the first target space for testing and second original ROIs for testing in the second target space for testing; (II) instructing the determining network included in the DNN to apply the FC operations to the pair feature vectors for testing, to thereby generate (i) one or more determination vectors for testing including information on probabilities for testing of the first original ROIs for testing and the second original ROIs for testing included in each of the pairs for testing being appropriate to be integrated and (ii) one or more box regression vectors for testing including information on each of relative 3-dimensional locations for testing of integrated ROIs for testing, corresponding to at least part of the pairs for testing, comparing to each of original 3-Dimensional locations for testing of each component of said at least part of the pairs for testing, on the integrated target space for testing; (III) instructing a merging unit to generate the integrated object detection information for testing by merging at least part of the pairs for testing of first original bounding boxes for testing and second original bounding boxes for testing by referring to the determination vectors for testing and the box regression vectors for testing.

As one example, the first original image for testing on the first target space for testing, acquired through at least part of one or more first cameras, one or more first lidars and one or more first radars installed on the first vehicle, is processed by a first neural network included in the first vehicle, to thereby generate the first object detection information for testing including (i) first class information for testing on objects for testing included in the first target space for testing, (ii) feature values for testing of the first original ROIs for testing, (iii) 3-dimensional coordinate values for testing of the first original bounding boxes for testing and (iv) 3-dimensional coordinate values for testing of the first original ROIs for testing, and the second original image for testing on the second target space for testing, acquired through at least part of one or more second cameras, one or more second lidars and one or more second radars installed on the second vehicle, is processed by a second neural network included in the second vehicle, to thereby generate the second object detection information for testing including (i) second class information for testing on objects for testing included in the second target space for testing, (ii) feature values for testing of the second original ROIs for testing, (iii) 3-dimensional coordinate values for testing of the second original bounding boxes for testing and (iv) 3-dimensional coordinate values for testing of the second original ROIs for testing, and the second object detection information is delivered to the first vehicle through a V2V communication.

As one example, at the process of (I), a specific pair feature vector for testing, which is one of the pair feature vectors for testing, includes (i) first class information for testing of a first specific object for testing included in the first target space for testing, (ii) feature values for testing of a first specific original ROI for testing including the first specific object for testing, (iii) 3-dimensional coordinate values of a first specific original bounding box for testing corresponding to the first specific original ROI for testing, (iv) 3-dimensional coordinate values of the first specific original ROI for testing, (v) second class information for testing of a second specific object for testing included in the second target space for testing, (vi) feature values for testing of a second specific original ROI for testing including the second specific object for testing, (vii) 3-dimensional coordinate values of a second specific original bounding box for testing corresponding to the second specific original ROI for testing, and (viii) 3-dimensional coordinate values of the second specific original ROI for testing.

As one example, at the process of (II), a specific determination vector for testing, which is one of the determination vectors for testing and corresponds to the specific pair feature vector for testing, includes information on a probability of the first specific original ROI for testing and the second specific original ROI for testing being integrated on the integrated target space for testing, and a specific box regression vector for testing, which is one of the box regression vectors for testing and corresponds to the specific pair feature vector for testing, includes information on 3-dimensional coordinates of a specific integrated bounding box for testing generated by merging the first specific original ROI for testing and the second specific original ROI for testing on the integrated target space for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
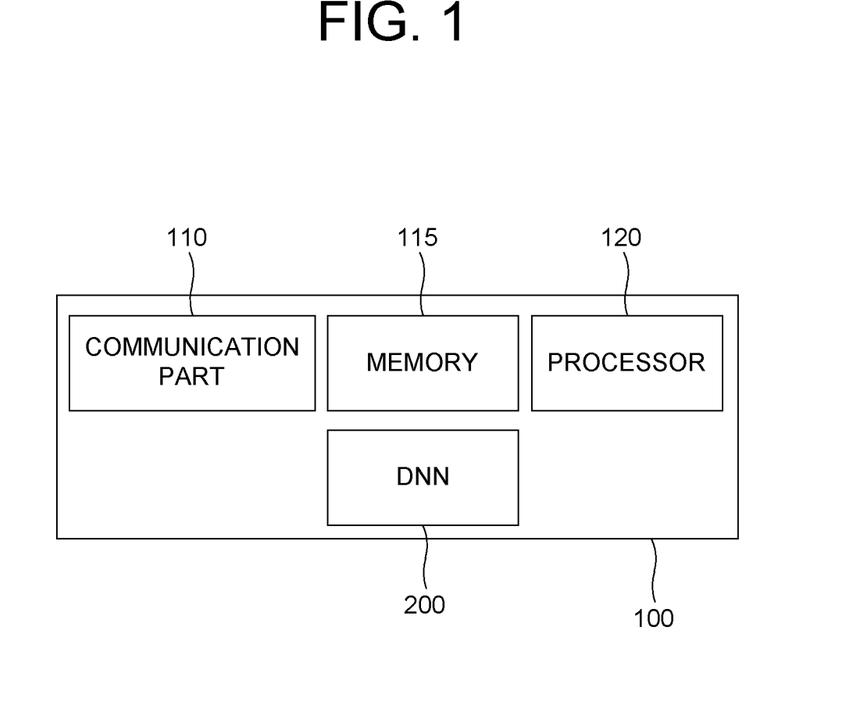
FIG. 1 is a drawing schematically illustrating a learning device performing a learning method for integrating object detection information acquired through V2V communication from other autonomous vehicle with object detection information generated by present autonomous vehicle in accordance with one example embodiment of the present disclosure.

FIG. 1 is a drawing schematically illustrating a learning device performing a learning method for integrating object detection information acquired through V2V communication from other autonomous vehicle with object detection information generated by present autonomous vehicle in accordance with one example embodiment of the present disclosure.

By referring to FIG. 1, the learning device 100 may include a DNN 200, to be described in detail later. Processes of input/output and computations of the DNN 200 may be respectively performed by a communication part 110 and a processor 120. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

The above description shows a configuration of the learning device 100 performing the learning method for integrating object detection information acquired through V2V communication from other autonomous vehicle with object detection information generated by present autonomous vehicle in accordance with one example embodiment of the present disclosure, and by referring to FIG. 2, a detailed configuration and learning processes of the DNN 200 are described below.

Figure 2:
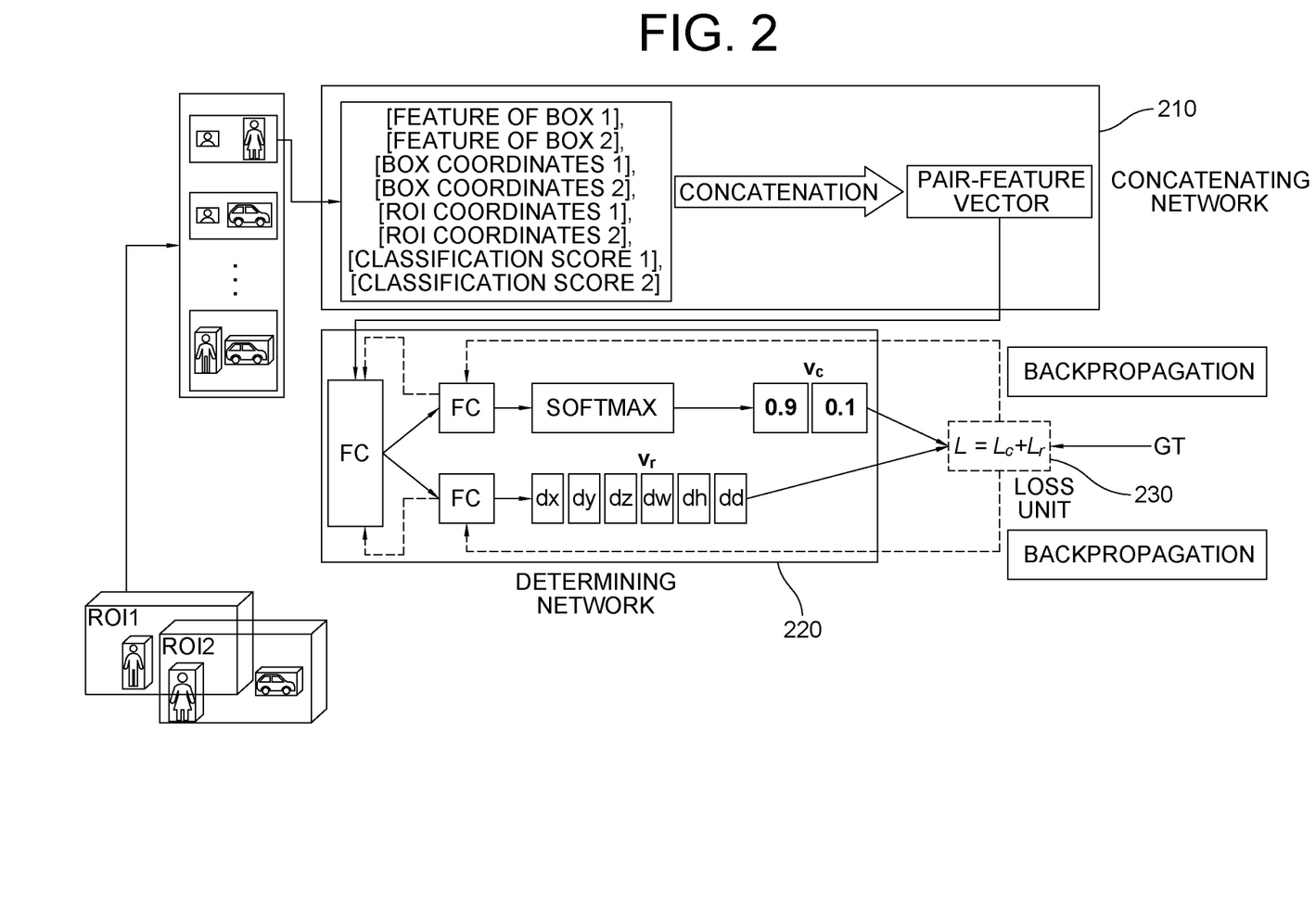
FIG. 2 is a drawing schematically illustrating a detailed operation of the learning device performing the learning method for integrating object detection information acquired through V2V communication from other autonomous vehicle with object detection information generated by present autonomous vehicle in accordance with one example embodiment of the present disclosure.

FIG. 2 is a drawing schematically illustrating a detailed operation of the learning device performing the learning method for integrating object detection information acquired through V2V communication from other autonomous vehicle with object detection information generated by present autonomous vehicle in accordance with one example embodiment of the present disclosure.

By referring to FIG. 2, the DNN 200 may include a concatenating network 210 and a determining network 220, and the learning device 100 may include a loss unit 230 corresponding to the DNN 200. Specifically, if each piece of the object detection information of each of the target spaces each of which corresponds to each of vehicles is acquired through V2V communication from each of vehicles, the learning device 100 may transmit said each piece of the object detection information to the concatenating network 210 in the DNN 200. The V2V communication can be configured with any prior arts such as 4G communication or 5G communication, which are capable of transmitting large amount of data. Herein, said each piece of the object detection information may include information on each of ROIs in each of the target spaces corresponding to each of the vehicles, each of objects in each of the ROIs and its corresponding original bounding box. Also, the ROIs and the original bounding boxes may be 3-dimensional. However such 3-dimensional ROIs and such 3-dimensional original bounding boxes may be similar to those of 2-dimensions except their dimension. Additionally, each of the original images of the target spaces may be each of images of the specific space taken from various perspective at a same point of time, by each of vehicles located near to each other. Therefore, each of contents of each of the original images may be same or similar to one another, and each of original ROIs for each of the original images may also include same or similar regions.

If the object detection information is acquired as such, the concatenating network 210 may pair at least part of each of the original bounding boxes included in the original ROIs, to thereby generate one or more so-called pair feature vectors. As one example, the concatenating network 210 may integrate a first specific original bounding box and a second specific original bounding box, each included in a first original ROI of first object detection information generated by a first vehicle and a second original ROI of second object detection information generated by a second vehicle, to thereby generate a specific pair feature vector among the pair feature vectors including (i) feature values of the first original bounding box, (ii) 3-dimensional coordinate information of the first original bounding box, and (iii) first class information on an object in the first original bounding box, (iv) feature values of the second original bounding box, (v) 3-dimensional coordinate information of the second original bounding box, and (vi) second class information on an object in the second original bounding box, (vii) 3-dimensional coordinates of the first specific original ROI, and (viii) 3-dimensional coordinates of the second specific original ROI. Herein, first object detection information on a first original image may include (i), (ii), (iii) and (vii), and second object detection information may include (iv), (v), (vi), and (viii). The first specific original ROI may include one or more first original bounding boxes, the second specific original ROI may include one or more second original bounding boxes, and each of the first original bounding boxes in the first specific original ROI and each of the second original bounding boxes in the second specific original ROI may be paired once, to thereby generate each of the pair feature vectors.

Such first original ROI including the first specific original bounding box may be included in a first target space, among the target spaces. Similarly, the second original ROI including the second specific original bounding box may be included in a second target space, among the target spaces.

By referring to FIG. 3, an example of the specific pair feature vector is described in detail as below.

Figure 3:
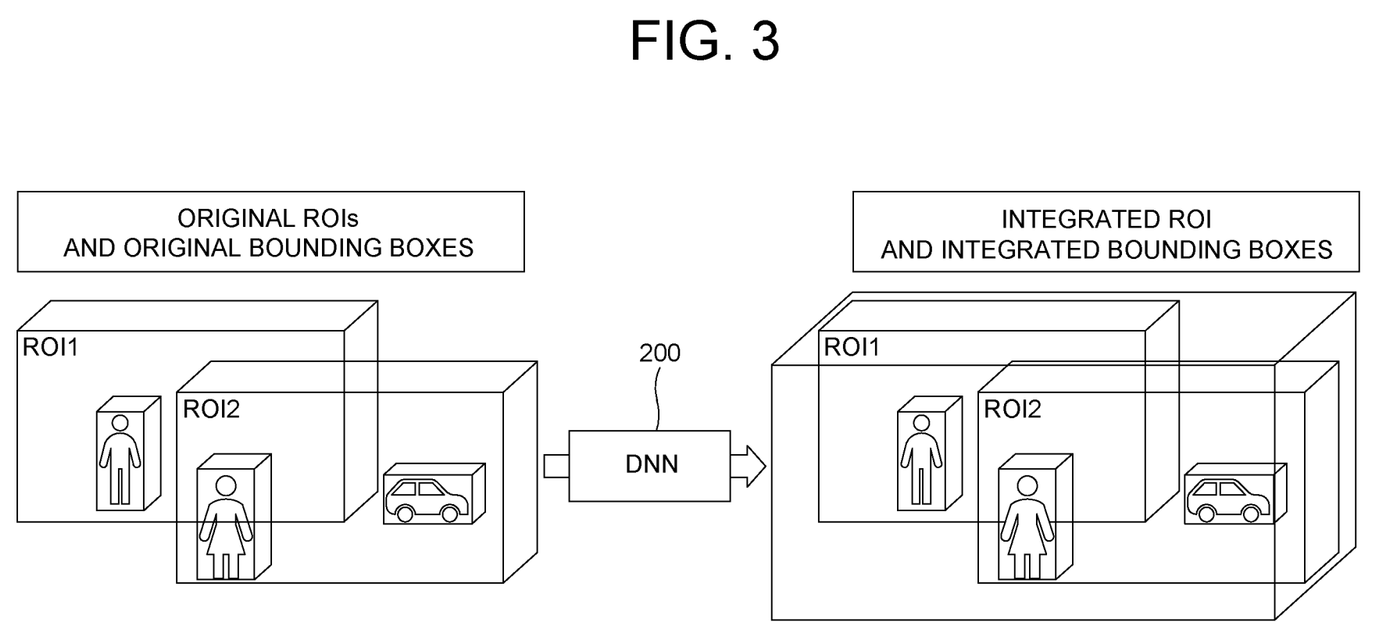
FIG. 3 is a drawing schematically illustrating an example of integrating a first specific original ROI and a second specific original ROI through the learning method for integrating object detection information acquired through V2V communication from other autonomous vehicle with object detection information generated by present autonomous vehicle in accordance with one example embodiment of the present disclosure.

FIG. 3 is a drawing schematically illustrating an example of integrating a first specific original ROI and a second specific original ROI through the learning method for integrating object detection information acquired through V2V communication from other autonomous vehicle with object detection information generated by present autonomous vehicle in accordance with one example embodiment of the present disclosure.

The first specific original ROI may include one of the first bounding boxes containing a male and another one of the first bounding boxes containing an upper body of a female, and the second specific original ROI may include one of the second bounding boxes containing the female and another one of the second bounding boxes containing a vehicle. Herein, a total of four bounding box pairs may be generated, for example, (i) said one of the first bounding boxes containing the upper body of the female with said one of the second bounding boxes containing the female, (ii) said one of the first bounding boxes containing the upper body of the female with said another one of the second bounding boxes containing the vehicle, (iii) said another one of the first bounding boxes containing the male with said one of the second bounding boxes containing the female, and (iv) said another one of the first bounding boxes containing the male with said another one of the second bounding boxes containing the vehicle. As one example, the specific pair feature vector generated by using the pair of said one of the first bounding boxes containing the upper body of the female with said one of the second bounding boxes containing the female may include aforementioned information on those bounding boxes.

If the pair feature vectors are generated as such, the learning device 100 may instruct the determining network 220 in the DNN 200 to generate one or more determination vectors $v_C$ and one or more box regression vectors $v_r$ by at least one FC operation. Herein, one of the determination vectors $v_C$ may represent whether the two original bounding boxes can be integrated, each of which is included in two original ROIs as a pair, and as one example, its first component may be a probability of the two original bounding boxes being integrated, and its second component may be a probability of the two original bounding boxes not being integrated. Herein, the determining network 220 may calculate each probability of each component. By referring to FIG. 2 again, the probability of the pair corresponding to the specific pair feature vector being integrated may be calculated as 0.9. One of the box regression vectors $v_r$ may have, as its components, values of changes corresponding to changes of coordinates of vertices according to integration of the two original bounding boxes. Specifically, the values of changes in one of the box regression vectors may correspond to information on respective differences between (I) (i) a horizontal length, (ii) a vertical length, and (iii) x and y coordinates of a center, of an intersection of the two original bounding boxes, and (II) (i) a horizontal length, (ii) a vertical length, and (iii) x and y coordinates of a center, of an integrated bounding box into which the two original bounding boxes are integrated. That is, the box regression vectors may include information on each of relative locations of integrated ROIs corresponding to at least part of the pairs, comparing to original locations of each component of said at least of the pairs, on the integrated image.

In one embodiment, the box regression vectors may not correspond to all of the pair feature vectors. That is, those can be generated by selecting some of the pair feature vectors and applying at least part of the FC operations to the selected pair feature vectors. Such embodiment will be explained later in detail.

If the determination vectors and the box regression vectors are generated as such, the learning device 100 may instruct the loss unit 230 to calculate one or more losses by referring to the determination vectors, the box regression vectors, and their corresponding GTs. The losses may include two components $L_c$ and $L_r$, where the $L_c$ may be a determination loss related to the determination vectors and may be calculated by using a cross entropy, and the $L_r$ may be a box regression loss related to the box regression vectors and may be calculated by using a smooth L1 loss.

More specifically, the determination loss may be generated by a formula below:

$$L_c = \frac{1}{n}\sum_{i=1}^{n} \langle v_c^i, \log(v_{C-GT}^i) \rangle$$

Herein, n denotes the number of the determination vectors, $v_c^i$ denotes an i-th determination vector among the determination vectors, $v_{C-GT}^i$ denotes an i-th determination GT vector on the i-th determination vector.

And, the box regression loss may be generated by a formula below:

$$L_r = \frac{1}{n}\sum_{i=1}^{n} smooth_{L1}(v_r^i, v_{R-GT}^i)$$

where $smooth_{L1}(x, y) = \begin{cases} 0.5|x-y|^2, & \text{if } |x-y| < 1 \\ |x-y| - 0.5, & \text{otherwise} \end{cases}$ Herein n denotes the number of the box regression vectors, $v_c^i$ denotes an i-th box regression vector, $v_{C-GT}^i$ denotes an i-th box regression GT vector on the i-th box regression vector.

After the losses are generated, such losses may be back-propagated to be used for learning at least part of one or more parameters of the determining network 220 in the DNN 200. As a result, the determining network 220 determines more accurately whether its inputted bounding boxes can be integrated, and predicts more accurately the information on the vertices after the integration.

As an additional embodiment of the present invention, the learning device 100 may instruct the determining network 220 included in the DNN 200 to generate the determination vectors by applying at least part of the FC operations to the pair feature vectors, and to generate the one or more box regression vectors corresponding to one or more specific pair feature vectors among the pair feature vectors whose corresponding values in corresponding specific determination vectors denoting specific probabilities of corresponding specific pairs to be integrated are larger than a prescribed threshold. This embodiment can be efficient because it does not calculate the coordinates of pairs whose probabilities of being integrated are smaller than the threshold.

Herein, how the DNN 200 works will be explained below. The learning device 100 instructs each of deep learning neurons included in one or more layers of the DNN 200 to repeatedly apply one or more convolutional operations to its input by using its own at least one parameter and deliver its output to its next deep learning neuron, to thereby generate the pair feature vectors, the determination vectors and the box regression vectors.

After completion of the learning processes above, the learning device 100 of the present disclosure may function as a testing device as described below by referring to FIG. 4.

For reference, in the description below, the phrase "for training" or "training" is added for terms related to the learning processes, and the phrase "for testing" or "testing" is added for terms related to testing processes, to avoid possible confusion.

Figure 4:
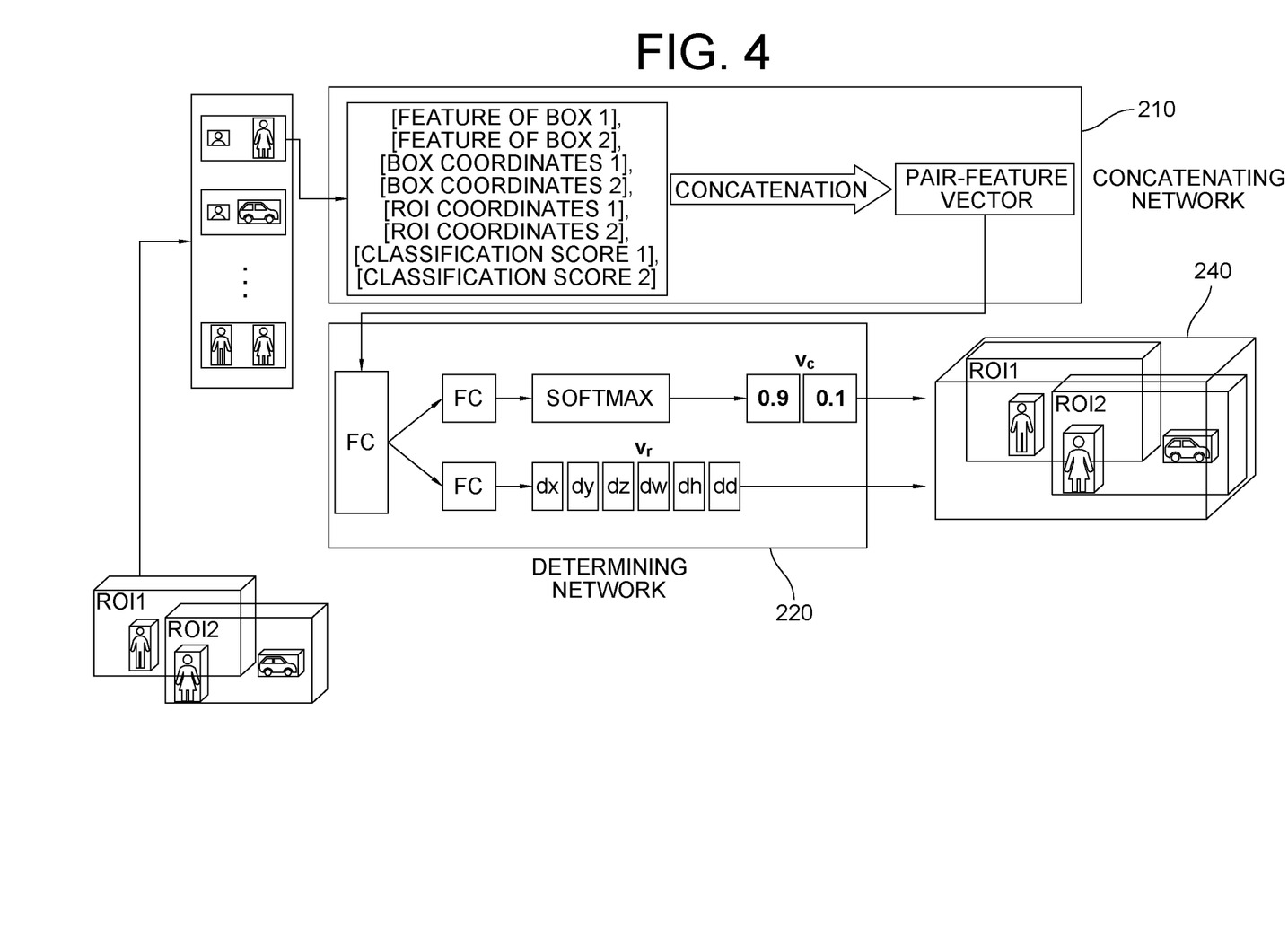
FIG. 4 is a drawing schematically illustrating a detailed operation of a testing device on condition that the learning method for integrating object detection information acquired through V2V communication from other autonomous vehicle with object detection information generated by present autonomous vehicle has been completed in accordance with one example embodiment of the present disclosure.

FIG. 4 is a drawing schematically illustrating a detailed operation of a testing device on condition that the learning method for integrating object detection information acquired through V2V communication from other autonomous vehicle with object detection information generated by present autonomous vehicle has been completed in accordance with one example embodiment of the present disclosure.

By referring to FIG. 4, the testing device may include a merging unit 240 instead of the loss unit 230. If a probability, included in at least one determination vector for testing, of two original bounding boxes for testing to be integrated is equal to or greater than a certain threshold, the merging unit may calculate coordinates of vertices of an integrated bounding box for testing into which the two original bounding boxes for testing are integrated by using values of changes for testing in at least one box regression vector for testing. Each of the pairs of the original ROIs may be integrated by repeating such operations on pair feature vectors for testing of the pairs of the original ROIs, and thereafter, the operations may be applied to every original ROI, to thereby integrate the original images, and thus results of object detection on the integrated target space may be generated without additional operations on the integrated image. Functions of other components like the concatenating network 210 and the determining network 220 are similar to their functions when performing in the learning device 100 and thus omitted.

Specifically, a testing method for generating integrated object detection information for testing on an integrated target space for testing including a first target space for testing and a second target space for testing, by integrating first object detection information for testing on the first target space for testing generated by a first vehicle for testing and second object detection information for testing on the second target space for testing generated by a second vehicle for testing can be presented.

First, on condition that (1) a learning device 100, if first object detection information for training on a first target space for training and second object detection information for training on a second target space for training have been acquired by processing a first original image for training on the first target space for training and a second original image for training on the second target space for training, has instructed the concatenating network 210 included in the DNN 200 to generate one or more pair feature vectors for training including information on one or more pairs for training of first original ROIs for training included in the first target space for training and second original ROIs for training in the second target space for training; (2) the learning device 100 has instructed the determining network 220 included in the DNN 200 to apply one or more FC operations to the pair feature vectors for training, to thereby generate (i) one or more determination vectors for training including information on probabilities for training of the first original ROIs for training and the second original ROIs for training included in each of the pairs for training being appropriate to be integrated and (ii) one or more box regression vectors for training including information on each of relative 3-Dimensional locations for training of integrated ROIs for training, corresponding to at least part of the pairs for training, comparing to each of original 3-Dimensional locations for training of each component of said at least part of the pairs for training, on an integrated target space for training; (3) the learning device 100 has instructed the loss unit 230 to generate an integrated loss by referring to the determination vectors for training, the box regression vectors for training and their corresponding GTs, and performing backpropagation processes by using the integrated loss, to thereby learn at least part of parameters included in the DNN, a testing device installed on the first vehicle, if the first object detection information for testing on the first target space for testing and the second object detection information for testing on the second target space for testing are acquired by processing a first original image for testing on the first target space for testing and a second original image for testing on the second target space for testing, may instruct the concatenating network 210 included in the DNN 200 to generate one or more pair feature vectors for testing including information on one or more pairs for testing of first original ROIs for testing included in the first target space for testing and second original ROIs for testing in the second target space for testing.

After, the testing device may instruct the determining network 220 included in the DNN 200 to apply the FC operations to the pair feature vectors for testing, to thereby generate (i) one or more determination vectors for testing including information on probabilities for testing of the first original ROIs for testing and the second original ROIs for testing included in each of the pairs for testing being appropriate to be integrated and (ii) one or more box regression vectors for testing including information on each of relative 3-dimensional locations for testing of integrated ROIs for testing, corresponding to at least part of the pairs for testing, comparing to each of original 3-Dimensional locations for testing of each component of said at least part of the pairs for testing, on the integrated target space for testing.

Finally, the testing device may instruct a merging unit to generate the integrated object detection information for testing by merging at least part of the pairs for testing of first original bounding boxes for testing and second original bounding boxes for testing by referring to the determination vectors for testing and the box regression vectors for testing.

Herein, the first original image for testing on the first target space for testing may be acquired through at least part of one or more first cameras, one or more first lidars and one or more first radars installed on the first vehicle, and may be processed by a first neural network included in the first vehicle, to thereby generate the first object detection information for testing including (i) first class information for testing on objects for testing included in the first target space for testing, (ii) feature values for testing of the first original ROIs for testing, (iii) 3-dimensional coordinate values for testing of the first original bounding boxes for testing and (iv) 3-dimensional coordinate values for testing of the first original ROIs for testing.

Similarly, the second original image for testing on the second target space for testing may be acquired through at least part of one or more second cameras, one or more second lidars and one or more second radars installed on the second vehicle, and may be processed by a second neural network included in the second vehicle, to thereby generate the second object detection information including (i) second class information for testing on objects for testing included in the second target space for testing, (ii) feature values for testing of the second original ROIs for testing, (iii) 3-dimensional coordinate values for testing of the second original bounding boxes for testing and (iv) 3-dimensional coordinate values for testing of the second original ROIs for testing, and the second object detection information is delivered to the first vehicle through a V2V communication.

The first neural network and the second neural network may be neural networks configured to detect objects. Any well-known prior art used for object detection in the field of deep learning may be used, such as SVNet and ImageNet.

Herein, the DNN 200 of the present disclosure can be called as a merging network, since it merges different pieces of object detection information.

The present disclosure is for integrating information acquired through the V2V communications by using a merging network performing a non-maximum suppression, and is related to collaborative driving. If object detection results generated by multiple different vehicles are acquired through the V2V communications, ROIs will be different for each of the multiple different vehicles, and all of the ROIs will be integrated into a single integrated ROI in accordance with one example of the present disclosure. For this purpose, the merging network is utilized, and as a result, a goal of safer autonomous driving is achieved.

The present disclosure has an effect of providing the learning method for integrating object detection information acquired through V2V communication from other autonomous vehicle with object detection information generated by present autonomous vehicle, to thereby improve a safety of the autonomous vehicles using the integrated space detection result.

As can be understood by those skilled in the art, it is clear that communication parts of the learning device 100 and the testing device may perform transmission of image data, for example, images described above like the original image, original labels, and additional labels, etc., and that processors and/or memories of the learning device 100 and the testing device may retain data for feature maps and performing operations, and that the processors of the learning device 100 and the testing device may perform convolution operations, deconvolution operations, and loss value operations, but the scope of the present disclosure is not limited thereto.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for generating integrated object detection information on an integrated target space including a first target space and a second target space, by integrating first object detection information on the first target space generated by a first vehicle and second object detection information on the second target space generated by a second vehicle, comprising steps of:

(a) a learning device, if the first object detection information on the first target space and the second object detection information on the second target space are acquired by processing a first original image on the first target space and a second original image on the second target space, instructing a concatenating network included in a Deep Neural Network (DNN) to generate one or more pair feature vectors including information on one or more pairs of first original Regions-of-Interest (ROIs) included in the first target space and second original ROIs in the second target space;

(b) the learning device instructing a determining network included in the DNN to apply one or more fully-connected operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative 3-dimensional locations of integrated ROIs, corresponding to at least part of the pairs, comparing to each of original 3-dimensional locations of each component of said at least part of the pairs, on the integrated target space;

(c) the learning device instructing a loss unit to generate an integrated loss by referring to the determination vectors, the box regression vectors and their corresponding Ground Truths (GTs), and performing backpropagation processes by using the integrated loss, to thereby learn at least part of parameters included in the DNN, wherein at the step of (a), a specific pair feature vector, which is one of the pair feature vectors, includes (i) first class information of a first specific object included in the first target space, (ii) feature values of a first specific original ROI including the first specific object, (iii) 3-dimensional coordinate values of a first specific original bounding box corresponding to the first specific original ROI, (iv) 3-dimensional coordinate values of the first specific original ROI, (v) second class information of a second specific object included in the second target space, (vi) feature values of a second specific original ROI including the second specific object, and (vii) 3-dimensional coordinate values of a second specific original bounding box corresponding to the second specific original ROI, and (viii) 3-dimensional coordinate values of the second specific original ROI, and at the step of (b), a specific determination vector, which is one of the determination vectors and corresponds to the specific pair feature vector, includes information on a probability of the first specific original ROI and the second specific original ROI being integrated on the integrated target space, and a specific box regression vector, which is one of the box regression vectors and corresponds to the specific pair feature vector, includes information on 3-dimensional coordinates of a specific integrated bounding box generated by merging the first specific original ROI and the second specific original ROI on the integrated target space.

2. The method of claim 1, wherein, at the step of (c), the learning device instructs the loss unit (i) to generate a determination loss by using at least part of the determination vectors through a cross entropy method, (ii) to generate a box regression loss by using at least part of the box regression vectors through a smooth-L1 method, and (iii) to generate the integrated loss by referring to the determination loss and the box regression loss.

3. The method of claim 2, wherein, at the step of (c), the determination loss is generated by a formula below:

$$L_c = \frac{1}{n}\sum_{i=1}^{n} \langle v_c^i, \log(v_{C\_GT}^i) \rangle$$

wherein n denotes the number of the determination vectors, $v_c^i$ denotes an i-th determination vector, $v_{C-GT}^i$ denotes an i-th determination GT vector on the i-th determination vector, and the box regression loss is generated by a formula below:

$$L_r = \frac{1}{n}\sum_{i=1}^{n} smooth_{L1}(v_r^i, v_{R-GT}^i)$$

$$\text{where } smooth_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_r^i$ denotes an i-th box regression vector, $v_{R-GT}^i$ denotes an i-th box regression GT vector on the i-th box regression vector.

4. The method of claim 1, wherein the learning device instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

5. The method of claim 1, wherein, at the step of (b), the learning device instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying any part of the FC operations to the specific pair feature vectors.

6. A testing method for generating integrated object detection information for testing on an integrated target space for testing including a first target space for testing and a second target space for testing, by integrating first object detection information for testing on the first target space for testing generated by a first vehicle for testing and second object detection information for testing on the second target space for testing generated by a second vehicle for testing, comprising steps of:

(a) on condition that (1) a learning device, if first object detection information for training on a first target space for training and second object detection information for training on a second target space for training have been acquired by processing a first original image for training on the first target space for training and a second original image for training on the second target space for training, has instructed a concatenating network included in a Deep Neural Network (DNN) to generate one or more pair feature vectors for training including information on one or more pairs for training of first original Regions-of-Interest (ROIs) for training included in the first target space for training and second original ROIs for training in the second target space for training; (2) the learning device has instructed a determining network included in the DNN to apply one or more fully-connected operations to the pair feature vectors for training, to thereby generate (i) one or more determination vectors for training including information on probabilities for training of the first original ROIs for training and the second original ROIs for training included in each of the pairs for training being appropriate to be integrated and (ii) one or more box regression vectors for training including information on each of relative 3-Dimensional locations for training of integrated ROIs for training, corresponding to at least part of the pairs for training, comparing to each of original 3-Dimensional locations for training of each component of said at least part of the pairs for training, on an integrated target space for training; (3) the learning device has instructed a loss unit to generate an integrated loss by referring to the determination vectors for training, the box regression vectors for training and their corresponding Ground Truths (GTs), and performing backpropagation processes by using the integrated loss, to thereby learn at least part of parameters included in the DNN, a testing device installed on the first vehicle, if the first object detection information for testing on the first target space for testing and the second object detection information for testing on the second target space for testing are acquired by processing a first original image for testing on the first target space for testing and a second original image for testing on the second target space for testing, instructing the concatenating network included in the DNN to generate one or more pair feature vectors for testing including information on one or more pairs for testing of first original ROIs for testing included in the first target space for testing and second original ROIs for testing in the second target space for testing;

(b) the testing device instructing the determining network included in the DNN to apply the FC operations to the pair feature vectors for testing, to thereby generate (i) one or more determination vectors for testing including information on probabilities for testing of the first original ROIs for testing and the second original ROIs for testing included in each of the pairs for testing being appropriate to be integrated and (ii) one or more box regression vectors for testing including information on each of relative 3-dimensional locations for testing of integrated ROIs for testing, corresponding to at least part of the pairs for testing, comparing to each of original 3-Dimensional locations for testing of each component of said at least part of the pairs for testing, on the integrated target space for testing;

(c) the testing device instructing a merging unit to generate the integrated object detection information for testing by merging at least part of the pairs for testing of first original bounding boxes for testing and second original bounding boxes for testing by referring to the determination vectors for testing and the box regression vectors for testing.

7. The method of claim 6, wherein the first original image for testing on the first target space for testing, acquired through at least part of one or more first cameras, one or more first lidars and one or more first radars installed on the first vehicle, is processed by a first neural network included in the first vehicle, to thereby generate the first object detection information for testing including (i) first class information for testing on objects for testing included in the first target space for testing, (ii) feature values for testing of the first original ROIs for testing, (iii) 3-dimensional coordinate values for testing of the first original bounding boxes for testing and (iv) 3-dimensional coordinate values for testing of the first original ROIs for testing, and the second original image for testing on the second target space for testing, acquired through at least part of one or more second cameras, one or more second lidars and one or more second radars installed on the second vehicle, is processed by a second neural network included in the second vehicle, to thereby generate the second object detection information including (i) second class information for testing on objects for testing included in the second target space for testing, (ii) feature values for testing of the second original ROIs for testing, (iii) 3-dimensional coordinate values for testing of the second original bounding boxes for testing and (iv) 3-dimensional coordinate values for testing of the second original ROIs for testing, and the second object detection information is delivered to the first vehicle through a V2V communication.

8. The method of claim 6, wherein, at the step of (a), a specific pair feature vector for testing, which is one of the pair feature vectors for testing, includes (i) first class information for testing of a first specific object for testing included in the first target space for testing, (ii) feature values for testing of a first specific original ROI for testing including the first specific object for testing, (iii) 3-dimensional coordinate values of a first specific original bounding box for testing corresponding to the first specific original ROI for testing, (iv) 3-dimensional coordinate values of the first specific original ROI for testing, (v) second class information for testing of a second specific object for testing included in the second target space for testing, (vi) feature values for testing of a second specific original ROI for testing including the second specific object for testing, (vii) 3-dimensional coordinate values of a second specific original bounding box for testing corresponding to the second specific original ROI for testing, and (viii) 3-dimensional coordinate values of the second specific original ROI for testing.

9. The method of claim 8, wherein, at the step of (b), a specific determination vector for testing, which is one of the determination vectors for testing and corresponds to the specific pair feature vector for testing, includes information on a probability of the first specific original ROI for testing and the second specific original ROI for testing being integrated on the integrated target space for testing, and a specific box regression vector for testing, which is one of the box regression vectors for testing and corresponds to the specific pair feature vector for testing, includes information on 3-dimensional coordinates of a specific integrated bounding box for testing generated by merging the first specific original ROI for testing and the second specific original ROI for testing on the integrated target space for testing.

10. A learning device for generating integrated object detection information on an integrated target space including a first target space and a second target space, by integrating first object detection information on the first target space generated by a first vehicle and second object detection information on the second target space generated by a second vehicle, comprising:
at least one memory that stores instructions; and
at least one processor configured to execute the instructions to perform processes of (I) if the first object detection information on the first target space and the second object detection information on the second target space are acquired by processing a first original image on the first target space and a second original image on the second target space, instructing a concatenating network included in a Deep Neural Network (DNN) to generate one or more pair feature vectors including information on one or more pairs of first original Regions-of-Interest (ROIs) included in the first target space and second original ROIs in the second target space; (II) instructing a determining network included in the DNN to apply one or more fully-connected operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative 3-dimensional locations of integrated ROIs, corresponding to at least part of the pairs, comparing to each of original 3-dimensional locations of each component of said at least part of the pairs, on the integrated target space; (III) instructing a loss unit to generate an integrated loss by referring to the determination vectors, the box regression vectors and their corresponding Ground Truths (GTs), and performing backpropagation processes by using the integrated loss, to thereby learn at least part of parameters included in the DNN, wherein
at the process of (I), a specific pair feature vector, which is one of the pair feature vectors, includes (i) first class information of a first specific object included in the first target space, (ii) feature values of a first specific original ROI including the first specific object, (iii) 3-dimensional coordinate values of a first specific original bounding box corresponding to the first specific original ROI, (iv) 3-dimensional coordinate values of the first specific original ROI, (v) second class information of a second specific object included in the second target space, (vi) feature values of a second specific original ROI including the second specific object, and (vii) 3-dimensional coordinate values of a second specific original bounding box corresponding to the second specific original ROI, and (viii) 3-dimensional coordinate values of the second specific original ROI, and
at the process of (II), a specific determination vector, which is one of the determination vectors and corresponds to the specific pair feature vector, includes information on a probability of the first specific original ROI and the second specific original ROI being integrated on the integrated target space, and a specific box regression vector, which is one of the box regression vectors and corresponds to the specific pair feature vector, includes information on 3-dimensional coordinates of a specific integrated bounding box generated by merging the first specific original ROI and the second specific original ROI on the integrated target space.

11. The device of claim 10, wherein, at the process of (III), the processor instructs the loss unit (i) to generate a determination loss by using at least part of the determination vectors through a cross entropy device, (ii) to generate a box regression loss by using at least part of the box regression vectors through a smooth-L1 device, and (iii) to generate the integrated loss by referring to the determination loss and the box regression loss.

12. The device of claim 11, wherein, at the process of (III), the determination loss is generated by a formula below:

$$L_c = \frac{1}{n}\sum_{i=1}^{n} \langle v_c^i, \log(v_{C-GT}^i) \rangle$$

wherein n denotes the number of the determination vectors, $v_c^i$ denotes an i-th determination vector, $v_{C-GT}^i$ denotes an i-th determination GT vector on the i-th determination vector, and the box regression loss is generated by a formula below:

$$L_r = \frac{1}{n}\sum_{i=1}^{n} smooth_{L1}(v_r^i, v_{R-GT}^i)$$

$$\text{where } smooth_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_r^i$ denotes an i-th box regression vector, $v_{R-GT}^i$ denotes an i-th box regression GT vector on the i-th box regression vector.

13. The device of claim 10, wherein the processor instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

14. The device of claim 10, wherein, at the process of (II), the processor instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other any part of the FC operations to the specific pair feature vectors.

15. A testing device for generating integrated object detection information for testing on an integrated target space for testing including a first target space for testing and a second target space for testing, by integrating first object detection information for testing on the first target space for testing generated by a first vehicle for testing and second object detection information for testing on the second tamet space for testing generated by a second vehicle for testing, comprising:
at least one memory that stores instructions; and
at least one processor configured to execute the instructions to perform processes of: (I) on condition that (1) a learning device, if first object detection information for training on a first target space for training and second object detection information for training on a second target space for training have been acquired by processing a first original image for training on the first target space for training and a second original image for training on the second target space for training, has instructed a concatenating network included in a Deep Neural Network (DNN) to generate one or more pair feature vectors for training including information on one or more pairs for training of first original Regions-of-Interest (ROIs) for training included in the first target space for training and second original ROIs for training in the second target space for training; (2) the learning device has instructed a determining network included in the DNN to apply one or more fully-connected operations to the pair feature vectors for training, to thereby generate (i) one or more determination vectors for training including information on probabilities for training of the first original ROIs for training and the second original ROIs for training included in each of the pairs for training being appropriate to be integrated and (ii) one or more box regression vectors for training including information on each of relative 3-Dimensional locations for training of integrated ROIs for training, corresponding to at least part of the pairs for training, comparing to each of original 3-Dimensional locations for training of each component of said at least part of the pairs for training, on an integrated target space for training; (3) the learning device has instructed a loss unit to generate an integrated loss by referring to the determination vectors for training, the box regression vectors for training and their corresponding Ground Truths (GTs), and performing backpropagation processes by using the integrated loss, to thereby learn at least part of parameters included in the DNN, if the first object detection information for testing on the first target space for testing and the second object detection information for testing on the second target space for testing are acquired by processing a first original image for testing on the first target space for testing and a second original image for testing on the second target space for testing, instructing the concatenating network included in the DNN to generate one or more pair feature vectors for testing including information on one or more pairs for testing of first original ROIs for testing included in the first target space for testing and second original ROIs for testing in the second target space for testing; (II) instructing the determining network included in the DNN to apply the FC operations to the pair feature vectors for testing, to thereby generate (i) one or more determination vectors for testing including information on probabilities for testing of the first original ROIs for testing and the second original ROIs for testing included in each of the pairs for testing being appropriate to be integrated and (ii) one or more box regression vectors for testing including information on each of relative 3-dimensional locations for testing of integrated ROIs for testing, corresponding to at least part of the pairs for testing, comparing to each of original 3-Dimensional locations for testing of each component of said at least part of the pairs for testing, on the integrated target space for testing; (III) instructing a merging unit to generate the integrated object detection information for testing by merging at least part of the pairs for testing of first original bounding boxes for testing and second original bounding boxes for testing by referring to the determination vectors for testing and the box regression vectors for testing.

16. The device of claim 15, wherein the first original image for testing on the first target space for testing, acquired through at least part of one or more first cameras, one or more first lidars and one or more first radars installed on the first vehicle, is processed by a first neural network included in the first vehicle, to thereby generate the first object detection information for testing including (i) first class information on objects for testing included in the first target space for testing, (ii) feature values for testing of the first original ROIs for testing, (iii) 3-dimensional coordinate values for testing of the first original bounding boxes for testing and (iv) 3-dimensional coordinate values for testing of the first original ROIs for testing, and the second original image for testing on the second target space for testing, acquired through at least part of one or more second cameras, one or more second lidars and one or more second radars installed on the second vehicle, is processed by a second neural network included in the second vehicle, to thereby generate the second object detection information including (i) second class information on objects for testing included in the second target space for testing, (ii) feature values for testing of the second original ROIs for testing, (iii) 3-dimensional coordinate values for testing of the second original bounding boxes for testing and (iv) 3-dimensional coordinate values for testing of the second original ROIs for testing, and the second object detection information is delivered to the first vehicle through a V2V communication.

17. The device of claim 15, wherein, at the process of (I), a specific pair feature vector for testing, which is one of the pair feature vectors for testing, includes (i) first class information for testing of a first specific object for testing included in the first target space for testing, (ii) feature values for testing of a first specific original ROI for testing including the first specific object for testing, (iii) 3-dimensional coordinate values of a first specific original bounding box for testing corresponding to the first specific original ROI for testing, (iv) 3-dimensional coordinate values of the first specific original ROI for testing, (v) second class information for testing of a second specific object for testing included in the second target space for testing, (vi) feature values for testing of a second specific original ROI for testing including the second specific object for testing, (vii) 3-dimensional coordinate values of a second specific original bounding box for testing corresponding to the second specific original ROI for testing, and (viii) 3-dimensional coordinate values of the second specific original ROI for testing.

18. The device of claim 17, wherein, at the process of (II), a specific determination vector for testing, which is one of the determination vectors for testing and corresponds to the specific pair feature vector for testing, includes information on a probability of the first specific original ROI for testing and the second specific original ROI for testing being integrated on the integrated target space for testing, and a specific box regression vector for testing, which is one of the box regression vectors for testing and corresponds to the specific pair feature vector for testing, includes information on 3-dimensional coordinates of a specific integrated bounding box for testing generated by merging the first specific original ROI for testing and the second specific original ROI for testing on the integrated target space for testing.

* * * * *